United States Patent
Johnson

[11] Patent Number: 5,865,575
[45] Date of Patent: Feb. 2, 1999

[54] SELF-REVERSING TAPPING ATTACHMENT WITH SHOCK ABSORPTION

[75] Inventor: Allan S. Johnson, Harrison, Id.

[73] Assignee: The Tapmatic Corporation, Post Falls, Id.

[21] Appl. No.: 719,985

[22] Filed: Sep. 24, 1996

[51] Int. Cl.$^6$ .................................................. B23G 3/02
[52] U.S. Cl. ..................... 408/139; 192/48.91; 192/67; 408/143; 470/181
[58] Field of Search ................................... 408/139, 143; 192/67, 48.91; 470/181, 182

[56] References Cited

U.S. PATENT DOCUMENTS

| | | | |
|---|---|---|---|
| 3,717,892 | 2/1973 | Johnson | 470/182 |
| 3,999,642 | 12/1976 | Johnson | 408/139 |
| 4,705,437 | 11/1987 | Johnson | 470/181 |
| 4,832,542 | 5/1989 | Johnson et al. | 470/181 |
| 5,203,651 | 4/1993 | Johnson | 470/181 |
| 5,263,799 | 11/1993 | Blessing | 408/139 |

OTHER PUBLICATIONS

U.S. applicaton No. 08/218,257, Johnson, filed Mar. 28, 1994.

*Primary Examiner*—Steven C. Bishop
*Assistant Examiner*—Adesh Bhargava
*Attorney, Agent, or Firm*—Evanns & Walsh

[57] ABSTRACT

A self-reversing tapping attachment comprises a forward drive member and a reverse drive member drivingly engageable with a tap spindle drive member, as well as gear members drivingly engageable with the forward drive member and the reverse drive member, and includes shock absorbers cushioning impact between the driver members and the gear members. An exchangeable chuck holding a tap is detachably mountable on the tap spindle driver, permitting use of taps of different weight and material.

25 Claims, 4 Drawing Sheets

SELF-REVERSING TAPPING ATTACHMENT WITH SHOCK ABSORPTION

BACKGROUND OF THE INVENTION

1. Field of the Invention

The invention relates and pertains to tapping attachments, i.e. tools which carry taps for threading holes and are driven by a driving machine or power center and to reduction of stress and wear for components thereof.

2. Description of the Prior Art

The field of the invention and the prior art are exemplified in the field of self-reversing tapping attachments by reference to prior patents assigned to the assignee of the instant application. These include: U.S. Pat. Nos. 3,999,642; 4,014,421; 4,566,829; 4,705,437; 5,203,651; 5,209,616; 5,213,413 and 5,628,593 and patents cited therein, all of which are hereby incorporated by reference herein. The aforesaid patents and application disclose and claim tapping attachments including a tap holding spindle and simultaneously rotating forward and reverse drivers, the spindle being freely floating and moveable axially with respect to the forward and reverse drivers. Under forward drive in which the tap holder spindle is driven by the forward driver, the tap threads a hole being tapped in the workpiece and thereby screws itself into the hole. Upon cessation of feed by the driving machine with retraction of the driving machine, relative axial movement results between the tap holding spindle and the driver members such that the forward drive member becomes disengaged from the tap spindle which at this point is held relatively stationary due to the fact that the tap has become fastened to the workpiece. Upon further retractive movement by the tapping machine and further relative movement, the reverse drive member becomes engaged with the tap holding spindle, causing reverse rotation thereof and thereby unscrewing the tap from the hole. In this manner, self-reversing by the tapping attachment itself as opposed to reversing by the driving machine, is accomplished. With the advent of powerful Computer Numeric Control (CNC) machining centers, self-reversing has become of greater and greater importance in that it causes reversing to occur in the tapping attachment, as opposed to requiring the driving machine to reverse its direction of rotation.

Self-reversing tapping attachments have particular parts which due to the very nature of self-reversing suffer greater stress and wear than other parts, especially in connection with modern ultra-high-speed tapping. Such stress and wear occur primarily in the transition between forward and reverse, wherein the balls in the coupling on the tap holding spindle proceed through a limited neutral zone between engagement with splines on the forward drive element and splines on the reverse drive element.

Existing devices such as those described and claimed in the above-described patents and patent application have improved stress resistance and useful life of wearable components; however, ever higher demands of speed and performance call for further improvement in wearability and reduction of stress on wearable parts.

Thus, there has been a need for further improvements in decrease of wear and reduction of stress on wearable parts in tapping attachments, particularly with respect to those operable at ultra-high rpm.

SUMMARY OF THE INVENTION

A self-reversing tapping attachment comprises: tap holding spindle means; forward drive means and reverse drive means for engaging with the tap holding spindle means to impart forward and reverse rotation, respectively, thereto; and shock absorbing means associated with at least one of said forward drive means and said reverse drive means for providing cushioned engagement between said drive means and said tap holding spindle means.

BRIEF DESCRIPTION OF THE DRAWINGS

FIG. 3b is a bottom view of the part depicted in FIG. 3a;

FIG. 5b is a bottom view of the part depicted in FIG. 5a.

DETAILED DESCRIPTION OF A PREFERRED FORM OF THE INVENTION AND PREFERRED METHOD OF PRACTICE.

U.S. Pat. No. 5,203,651 and co-pending application Ser No. 08/218,257, now U.S. Pat. No. 5,628,593 assigned to the assignee of the instant application are hereby incorporated by reference herein. Many of the parts and components, as well as the overall system of a self-reversing tapping attachment are described and depicted in the common subject matter with the instant application. In the description that follows, only brief reference will be made to parts described and depicted in the foregoing and for purposes of brevity and clarity overlap between the instant application and the foregoing will be avoided to the extent possible.

Figure 1:
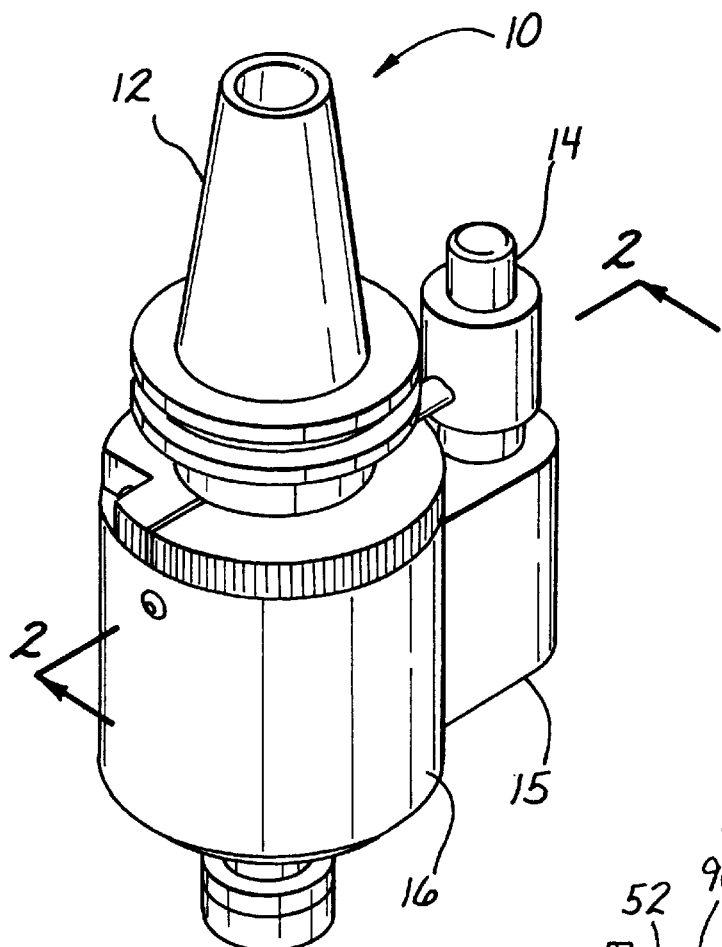
FIG. 1 is a perspective view of a tapping attachment in accordance with the invention.
Figure 2:
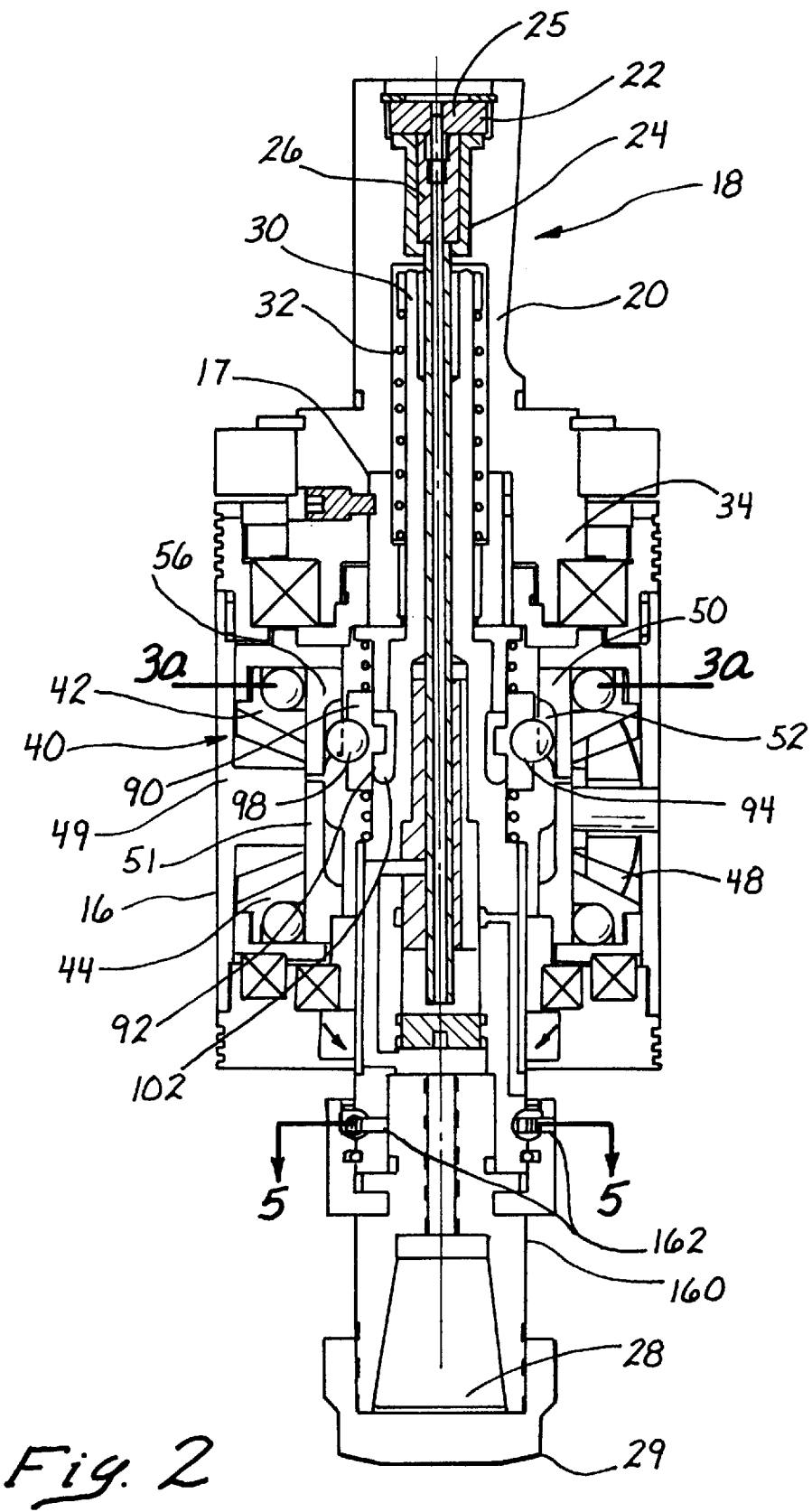
FIG. 2 is a sectional view, somewhat simplified, through the line 2—2 of FIG. 1.

As depicted in FIGS. 1 and 2, a tapping attachment 10 is coupleable through a shank 12 to a source of rotational drive in the form of a driving machine (not shown). A stem 14 is disposed in and extends from a closure 15 positioned adjacent a housing 16 of the tapping attachment 10 and is connectable in conventional fashion to the driving machine to provide restraint against rotation of the housing 16 of tapping attachment 10 when connected to the driving machine and to permit rotation under particular circumstances when not so connected. Housing 16 defines a central bore 17 for receiving a drive spindle member 18. Drive spindle member 18 partially extends outwardly of housing 16. At its upper end, spindle member 18 extends into and is engaged with the member 12 for engagement with the driving machine.

Figure 3A:
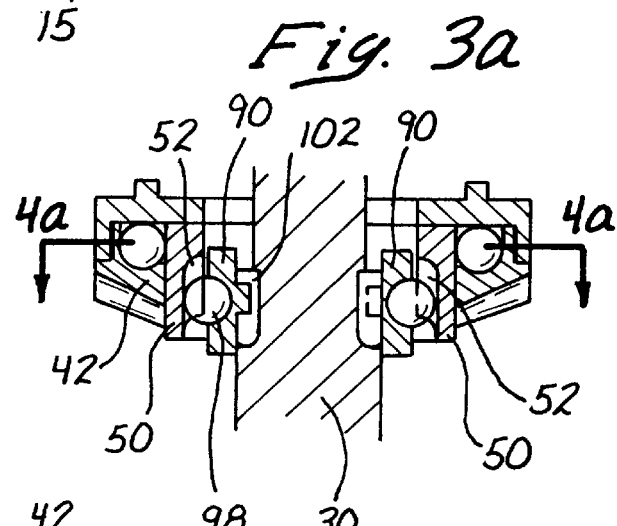
FIG. 3a is a fragmentary view of a portion of FIG. 2.
Figure 3B:
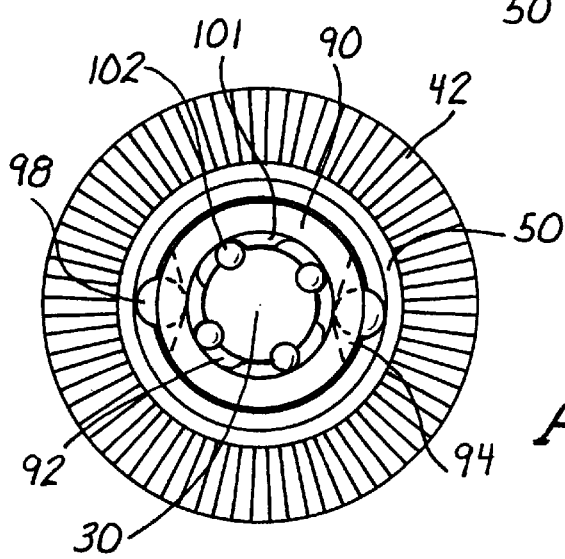
Figure 4A:
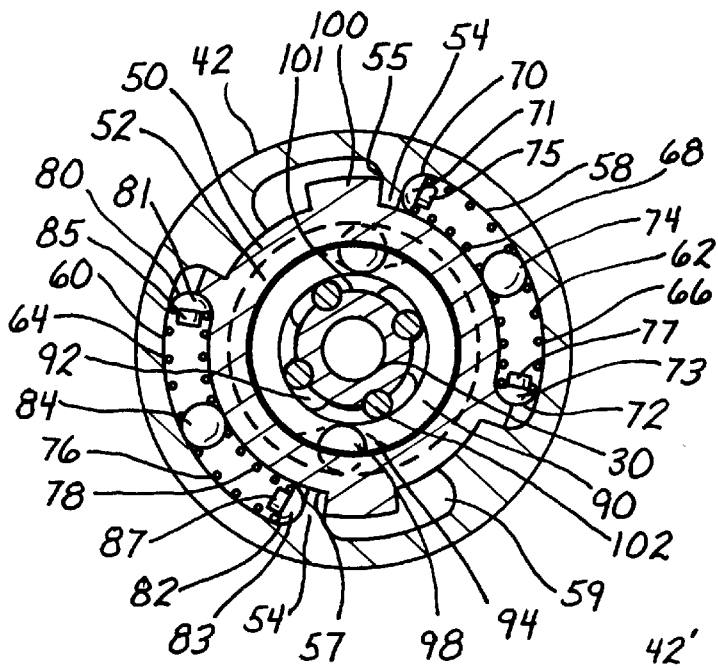
FIG. 4(a) is a sectional view through the line 4—4 of FIG. 3, and FIGS. 4b, 4c are sectional views of alternative embodiments of the invention.
Figure 4B:
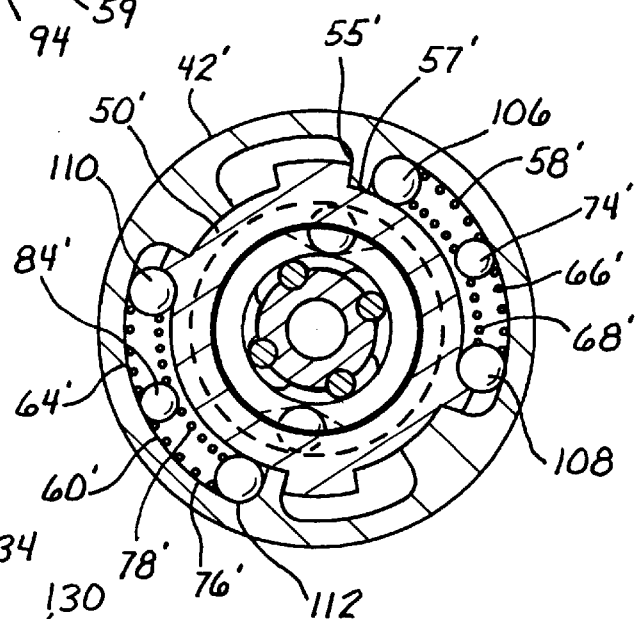
Figure 4C:
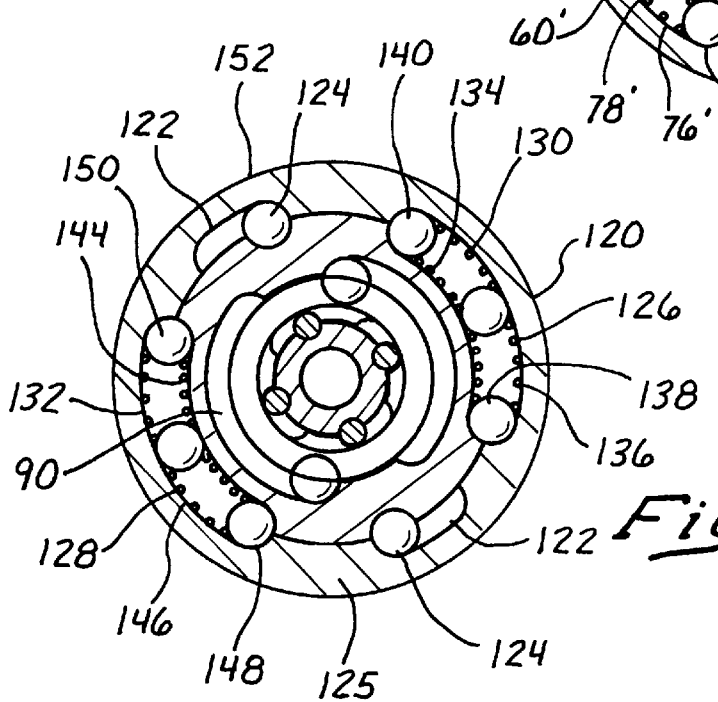
Figure 5A:
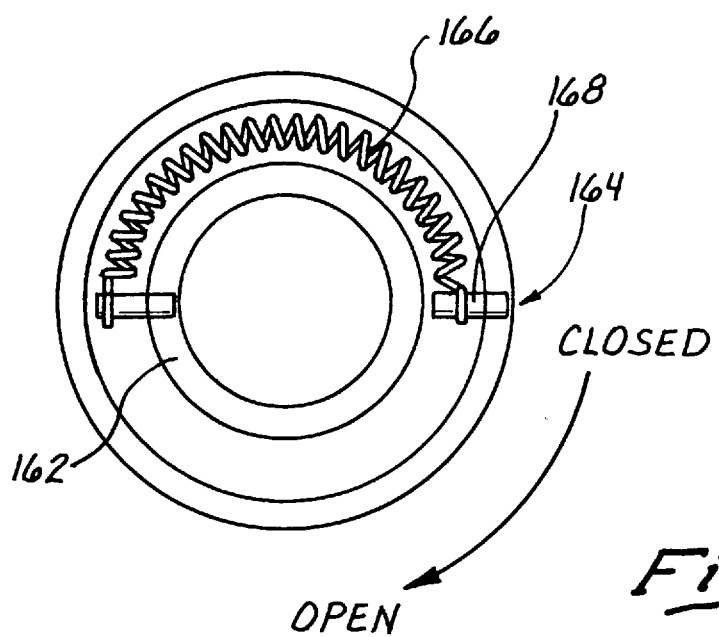
FIG. 5a is a top view of a part depicted in FIG. 3.
Figure 5B:
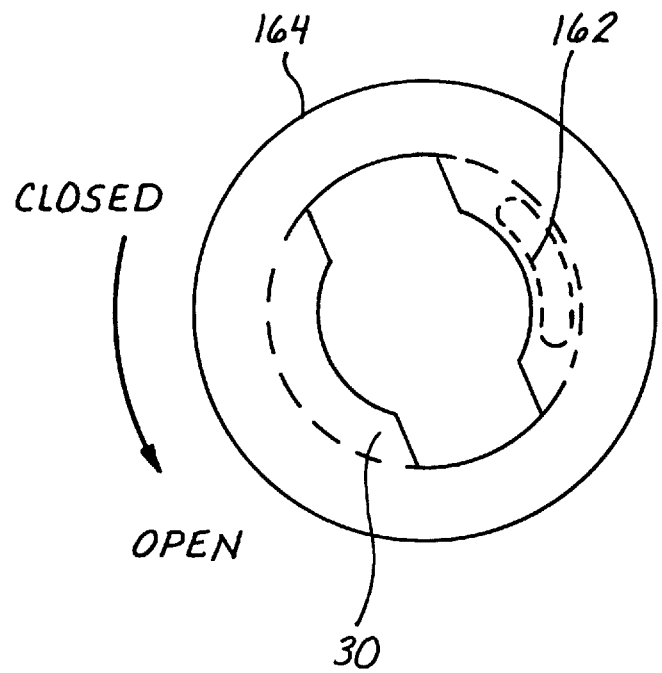

Referring now also to FIGS. 3–5, inclusive, drive spindle member 18 includes a mount 20 having an insert 22, defining a central bore 24. A coolant tube 26 connects to central bore 24 and forms a conduit for passage of coolant therethrough for the purpose of cooling the tap and clearing debris in the form of cuttings and the like from the work piece; a fluid inlet 25 connects to coolant tube 26. A tap is carried and held by a collet (not shown) in a collet space 28 secured by a chuck nut 29 on a tap spindle member 30 fastened to a return spring 32.

Drive spindle member 18 at an upper portion thereof extends outwardly of housing 16 as noted above and comprises a lower end portion 34 within housing 16.

Lower end portion 34 of drive spindle member 18 transmits torque to a gear drive 40, the gear drive 40 being of the general type described in U.S. Pat. No. 4,705,437 which is hereby incorporated by reference herein, except that the upper and lower gears herein have the same number of teeth. Gear drive 40 comprises an upper gear 42, a lower gear 44, and a plurality of planet gears 48.

A planet gear carrier 49 is mounted in housing 16. Planet gears 48 are mounted in planet gear carrier 49 and are positioned to be engageable with gears 42,44.

A forward drive member 50, of generally annular configuration, defines a central bore 52. Upper gear 42 carries on its radially inward wall at least one drive spline member 54. Forward drive member 50 is engageable with upper gear 42. A reverse drive member 51 is engageable with lower gear 44. Forward drive member 50 and reverse drive member 51 differ only in their dimension along the radial direction; thus, for brevity and clarity only one of the drive members, forward drive member 50, need be described explicitly herein.

Spline 54 on upper gear 42 comprises a pair of symmetrical generally arcuate contact areas 55, joined by a generally arcuate intermediate region 57.

Forward drive member 50 defines at least one, shown in the depicted embodiment as two, splines 100 for engaging upper gear 42. Upper gear 42 includes at least one, shown as two, inner recesses 59 for receiving splines 100 of forward drive member 50.

As seen in FIG. 4a, drive member 50 includes at least one (depicted herein as two) carriers 58, 60 for shock absorbers 62,64, respectively. Shock absorbers 62, 64 are identical and are described accordingly herein. Shock absorber 62 comprises a pair of compression spring members 66, 68, fastened at end pieces in the form of caps 70, 72. A torque transmitting member in the form of a ball 74 is disposed between and in contact with springs 66, 68. At carrier 60, spring members 76, 78, end pieces in the form of caps 80, 82 and torque member 84 correspond to parts 66, 68, 70, 72 and 74, respectively, at carrier 58. In other applications of the invention, shock absorbers may be attached to other members than the forward and reverse drive members 50, 51.

Carriers 58, 60 are positioned such as to be contactable by adjacent drive splines 54.

In particular applications of the invention, the length of shock absorber movement is substantially equal to one-quarter inch (¼"), though of course other particular dimensions may be employed in accordance with the invention.

Upon shock absorptive deformation of the spring members 66, 68, member 74 between the members rotates, thereby augmenting the spring-action. In accordance with the invention, a single spring member without a ball may be employed; such an arrangement would call for a spring with greater stiffness to perform the same functions as the device depicted in FIG. 4a.

End pieces 70, 72 comprise bases 71, 73, respectively, and stems 75, 77 respectively. Bases 71, 73 have contours such that they conform substantially to the contours of the ends of carriers 58, 60, respectively. Parts 71, 73, 75, 77 on carrier 58 correspond to the same parts 81, 83, 85, 87 on carrier 60.

As seen in FIGS. 2, 4a, forward drive member 50 is depicted in driving relationship with a tap spindle drive sleeve 90.

Depicted in FIG. 4b is an alternative embodiment of the invention. In this embodiment, parts 42', 50', 52', 54', 55', 57', 58', 60', 62', 64', 66', 68', 74', 76', 78', and 84' correspond to their unprimed numbered counterparts depicted in FIG. 4a. End pieces, 106, 108 in carrier 58' and end pieces 110, 112 in carrier 60', comprise spherical balls. In particular applications of the invention, the balls depicted in FIG. 4b may be employed in place of the caps depicted in FIG. 4a.

Depicted in FIG. 4c is a further alternative embodiment of the invention. As depicted in FIG. 4c, driving is accomplished through a ball drive as opposed to the ball/spline configuration described in connection with FIGS. 4a, 4b. Upper gear 120 is of annular configuration and includes a ball race 122 including at least two drive balls 124. A drive member 125 is engageable as the driven part with upper gear 120. On at least two carriers 126, 128 shock absorbers 130, 132, respectively, are mounted. Shock absorber 130 is of the same type as depicted in FIG. 4b, with a pair of compression spring members 134, 136 and a torque-transmitting ball member disposed in contact with spring members 134, 136 and end piece balls 138, 140. Shock absorber 132 comprises parts 144, 146, 148, 150 corresponding to parts 134, 136, 138, 140.

Drive sleeve 90 functions in similar manner to drive sleeve 90 of the preferred embodiment Drive sleeve 90 within housing 16 is generally cylindrical having a central bore 92 and defines at its periphery at least one slot 94 for accommodation and movement therein of drive balls 98. Drive sleeve member 90 includes at least one drive spline 101 engageable with tap spindle member 30, which carries at least one drive pin 102. Slot 94 is preferably of generally ellipsoidal configuration. Drive spline 101, drive pin 102 and slot 94 are in accordance with the disclosure and claims in U.S. Pat. No. 5,209,616 assigned to the assignee hereof and incorporated by reference herein. As disclosed in detail in U.S. Pat. No. 5,209,616 the configuration and relations of the above-described parts tend to minimize wear and shock in operation.

The tap is held in a holder in the form of a chuck 160, which is lockably mounted on tap spindle 30. The latter includes a pair of detents 162. Chuck 160 includes a locking collar 164 in which is mounted a locking spring 166 attached to locking pins 168 such that in the depicted configuration chuck 160 is held on tap spindle 30. This quick change arrangement is particularly useful in applications wherein tap spindles are composed of aluminum with chrome plating for purposes of decreasing weight and shock stress associated with the transition between forward and reverse.

At its lower end, coolant tube 26 aligns with the tap which contains channels (not shown) for passage therethrough of coolant from tube 26. The features and advantages of the coolant system herein are generally in accordance with the disclosure and claims of U.S. Pat. No. 5,213,453 assigned to the assignee of the instant application, which patent is hereby incorporated by reference herein.

In operation, rotation is transmitted from the driving machine to forward drive member 50 and to reverse drive member 51 through gear means 40, planet gear 48, upper gear 42 (forward drive) and lower gear 44 (reverse drive).

In forward drive, drive splines 54 of upper gear 42 drivingly engage with forward drive member 50. Drive member 50 is rotated in the forward direction and drivingly engages drive sleeve 90 which in turn drives tap spindle 30.

Coolant is provided during tapping from the driving machine 12 via the conduit 26. When the hole has been threaded to the selected depth and the tap is to be withdrawn from the hole, the tapping attachment 10 is raised by the driving machine. At this point, the tap is embedded in the hole and removal is most conveniently accomplished by reversing the tap rotation.

Accordingly, when the tapping attachment is raised the spindle member 30 and tap remain in the hole, forward drive member 50 and reverse drive member 51 moving axially upwardly relative to the spindle member 30.

As a result of the aforesaid axial movement, drive sleeve 90 briefly disengages from forward drive member 50 and after passing through a neutral zone engages reverse drive member 51, thereby causing reverse rotation of the spindle 30 enabling efficient withdrawal of the tap from the hole. Engagement between tap drive spindle 30 and the respective forward and reverse driver members 50, 51 is through the shock absorbers 58, 60 in forward drive and through identical parts (not shown) in reverse drive member 51. Upon initial contact in a transition among neutral forward and reverse, the shock absorbers 58, 60 absorb angular momentum by compression of their respective spring members. In a particular application referred to hereinabove, the cushioning/shock absorption takes place over a length substantially equal to one-quarter inch (¼"). Flexing of the spring members is augmented by the rotation of the ball members between them. After the initial impact, the drive elements come into positive engagement. It is believed that shock absorbers 58, 60 lessen shock and stress not only at initial contact but continuingly during driving.

To install tap holding chuck 160, the lock collar 164 attached to the lower end of spindle 30 is moved gradually and rotated until slots 162 in spindle 30 are exposed. Chuck 160 may then be installed and the collar 164 released, covering slots 162 and fastening chuck 160 in place. Removal is accomplished in reverse manner.

In this manner, a tapping attachment is provided with reduced wear and stress on working parts.

The foregoing is descriptive and illustrative, the invention being defined only by the appended claims interpreted in light of the specification.

What is claimed is:

1. A self-reversing tapping attachment comprising:
   (a) tap spindle means for holding a tap and rotatable for accomplishing tapping;
   (b) tap spindle drive means engageable to drive said tap spindle means;
   (c) forward drive means engageable in driving engagement with said tap spindle drive means to impart rotation to said tap spindle means for accomplishing tapping;
   (d) reverse drive means engageable in driving engagement with said tap spindle drive means to impart rotation to said tap spindle means in an opposite direction to rotation imparted by said forward drive means;
   (e) gear means for transmitting drive to said forward drive means and said reverse drive means, said tap spindle means being movable along the direction of tapping relative to said forward drive means and said reverse drive means; and
   (f) shock absorber means for absorbing shock of engagement between said gear means and at least one of said forward drive means and reverse drive means, at least one of said forward drive means and said reverse drive means including said shock absorber means.

2. The invention as set forth in claim 1 wherein said shock absorber means comprises at least one compression spring means.

3. The invention as set forth in claim 1 wherein said shock absorber means includes at least two springs and torque transmitting means disposed in contact between them.

4. The invention as set forth in claim 3 wherein said spring means includes end pieces fittable in said at least one gear means.

5. The invention as set forth in claim 3 wherein said tap spindle means includes tap holder means for detachably mounting a tap holder thereon, said tap holder means including means for lockably engaging with said tap spindle means.

6. The invention as set forth in claim 1 wherein said shock absorber means are carried by at least one of said forward drive means and said reverse drive means.

7. The invention as set forth in claim 1 wherein at least one of said forward drive means and said reverse drive means includes ball drive means for engaging in driving engagement with said tap spindle driving means.

8. The invention as set forth in claim 7 wherein said at least one drive means including said ball drive means further includes a ball race for containing said ball drive means.

9. The invention as set forth in claim 1 wherein said tap spindle means is fabricated from lightweight material selected from a class including aluminum.

10. The invention as set forth in claim 4 wherein said end pieces comprise caps.

11. The invention as set forth in claim 4 wherein said end pieces comprise substantially spherical members.

12. The invention as set forth in claim 1 wherein said shock absorber means are carried by said gear means.

13. The invention as set forth in claim 11 wherein said spherical members comprise ball members.

14. In a self-reversing tapping attachment comprising tap spindle means, tap spindle drive means engageable to drive said spindle means, forward drive means engageable in driving engagement with said spindle drive means, reverse drive means engageable in driving engagement with said tap spindle drive means to impart rotation to said tap spindle means in an opposite direction to rotation imparted by said forward drive means and gear means for transmitting drive to said forward drive means and said reverse drive means, said tap spindle drive means being movable along the direction of tapping relative to said forward drive means and said reverse drive means, the improvement comprising shock absorber means for absorbing shock of engagement between said gear means and at least one of said forward drive means and said reverse drive means, said gear means including said shock absorber means.

15. In a self-reversing tapping attachment comprising tap spindle means, tap spindle drive means engageable to drive said tap spindle means, forward drive means engageable in driving engagement with said tap spindle drive means, reverse drive means engagable in driving engagement with said tap spindle drive means to impart rotation to said tap spindle means in an opposite direction to rotation imparted by said forward drive means and gear means for transmitting drive to said forward drive means and said reverse drive means, said tap spindle drive means being movable along the direction of tapping relative to said forward drive means and said reverse drive means, the improvement comprising shock absorber means for absorbing shock of engagement between said gear means and at least one of said forward drive means and said reverse drive means, said shock absorber means being carried by at least one of said forward drive means and said reverse drive means.

16. The invention as set forth in claim 15 wherein wherein said shock absorber means comprises at least one compression spring means.

17. The invention as set forth in claim 16 wherein said shock absorber means includes at least two springs and torque transmitting means disposed in contact between them.

18. The invention as set forth in claim 15 wherein said spring means includes end pieces fittable in said gear means.

19. The invention as set forth in claim 17 wherein said tap spindle means includes tap holder means for detachably mounting a tap holder thereon, said tap holder means including means for lockably engaging with said tap spindle means.

20. The invention as set forth in claim 15 wherein at least one of said forward drive means and said reverse drive means includes ball drive means for engaging in driving engagement with said tap spindle driving means.

21. The invention as set forth in claim 20 wherein said at least one drive means including said ball drive means further includes a ball race for containing said ball drive means.

22. The invention as set forth in claim 15 wherein said tap spindle means is fabricated from lightweight material selected from a class including aluminum.

23. The invention as set forth in claim 15 wherein said end pieces comprise caps.

24. The invention as set forth in claim 18 where said end pieces comprise spherical members.

25. The invention as set forth in claim 24 wherein said spherical members comprise ball members.

* * * * *